April 11, 1967     L. R. BURWEGER     3,313,279
GUIDE BEARING FOR VALVE ROCKERS
Filed July 31, 1964
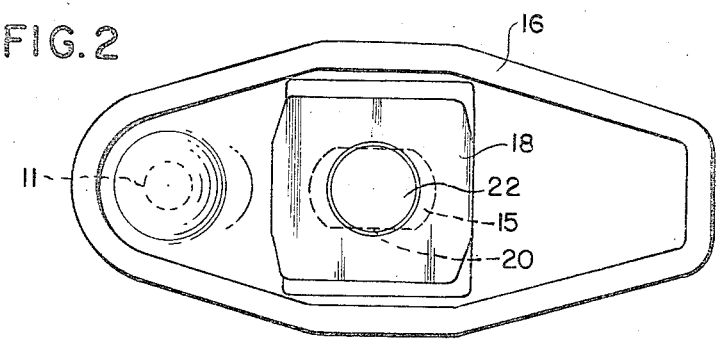
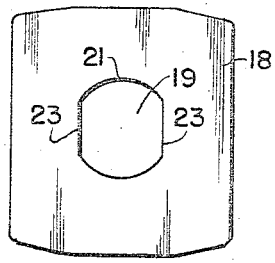
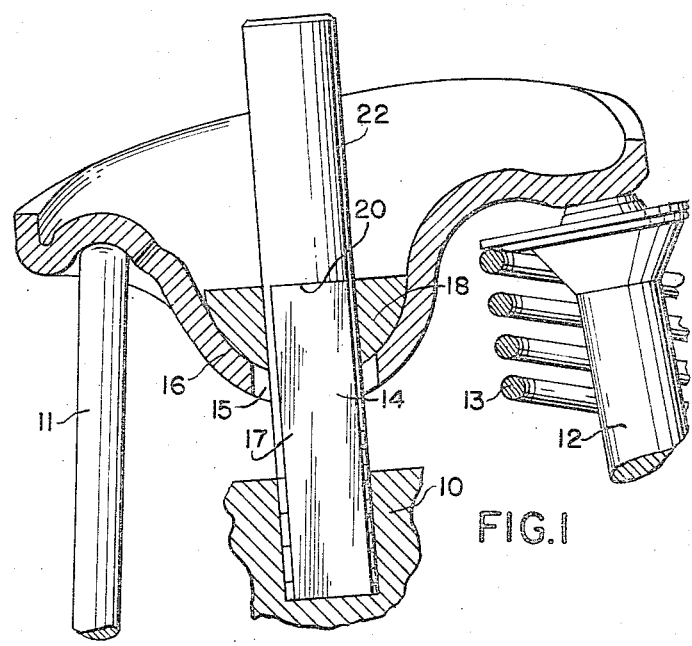
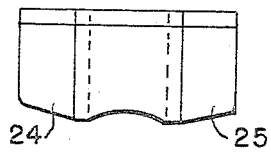
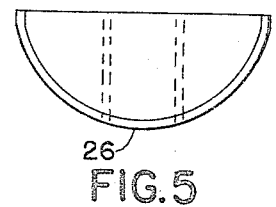
INVENTOR.
Lorenz R. Burweger
by *Joseph Hirschman*
ATTORNEY.

United States Patent Office 3,313,279
Patented Apr. 11, 1967

3,313,279
GUIDE BEARING FOR VALVE ROCKERS
Lorenz R. Burweger, Montvale, N.J., assignor to Welles Manufacturing Corp., Union City, N.J., a corporation of New Jersey
Filed July 31, 1964, Ser. No. 386,610
4 Claims. (Cl. 123—90)

The present invention relates to the mounting for the oscillating rockers for the valves of internal combustion engines, and more particularly to the pivot or bearing structure for the rocker and its support on the cylinder head of the engine.

It is the general object of the invention to provide a bearing for the individual rockers of the overhead valves of internal combustion engines which is of such construction that in association with an upwardly-facing concave rocker, it holds the latter in a fixed plane as it oscillates between the push rod and the valve stem, and in such manner that wear on the pivot is reduced and maintained uniform.

It is a further object of the invention to provide a pivot member for the rockers of internal combustion engines which is non-spherical in outline and may consist principally of a cylindrical section which may be provided with one or more irregularities or regions of discontinuity in its surface which can cooperate with mating grooves or ridges in the concave portion of the rocker receiving the bearing, so that the rocker is held against undesired migration relative to the bearing and is confined to the strictly necessary oscillatory movement for the operation of the valve.

More particularly, it is an object of the invention to provide an improved bearing construction which departs from the usual regular spherical configuration, and instead is composed of two or more sections of bodies of revolution so shaped as to provide one or more guiding edges or surfaces which cooperate with the rocker to insure the maintenance of the proper position of the rocker during its oscillatory movements, the outline of the bearing being that of a portion (preferably approximately half) of a body of revolution generated by a line which, if straight, is parallel to the axis of revolution but which may have one or more points of discontinuity, the portions of the line being either straight or curved, the inner surface of the rocker being matingly configured.

The rocker pivot or bearing commonly used at the present time consists of a section of a sphere having an opening through which passes a supporting stud provided with a head which acts as an abutment against which the pivot is pressed by the rocker under the action of the push rod and valve stem; the pivot being arranged between a spherical depression in the rocker and the head of the stud which is anchored on the cylinder head, the general effect being that of a universal joint. This type of construction has been found to be subject to wandering of the rocker in a more or less horizontal plane, so that the ends of the rocker move out of direct alignment with the push rod and valve stem, resulting in uneven wear at the points of contact between these parts and in increased noise. This type of construction is illustrated, for example, in the reissue patent to Leach No. 24,035, dated July 12, 1955.

With this known spherical type of pivot structure, the rocker is free not only to wander to a considerable extent in the horizontal plane, but also to be rotated angularly about the longitudinal axis or center line of the rocker, with the result that the ends of the rocker do not squarely engage, and are not engaged squarely by, the ends of the push rod and valve stem, but only at an angle to the ends of these members, or only over a portion of their surfaces. These aberrations from the normal relative positions result in reduced areas of contact and excessive local pressures, which in turn cause uneven wear and at the same time also destroy at least in part the registry with the oil duct or ducts feeding the various engaging surfaces.

In the known type of valve rocker mounting, also, the rocker is quite free to rotate about the axis of the stud; in addition, because of the difficulty in mass production of making the outer surface of the known hollow fulcrum member and the mating surface of the rocker, perfectly spherical and of the same radii, there occurs unavoidable play with continuing vibration and resulting noise and increased rate of wear, especially after initial wear has set in. As a result, repeated adjustments and even replacements become necessary. It has, furthermore, been found that in the known structure, the edges of the opening in the rocker through which the stud passes tend to gouge into the stem of the stud with resulting increased wear and vibration.

It is accordingly a still further object of the invention to provide a mounting for the rocker of the overhead type valve operating mechanism which includes a pivot or fulcrum member in the form of a guide bearing wherewith the rocker is guided and restrained from rotating in a plane transverse to the axis of the stud by the provision of interengaging surfaces removed from the edges of the opening in the rocker through which the stud passes, and in a manner whereby registry with the push rod and valve stem is at all times maintained, so that wear, vibration and noise are kept at a minimum.

In accordance with the present invention there are provided individual guide bearings or pivots for the rockers of internal combustion engines whose bearing surface is not composed entirely of a section of a sphere, but instead is composed principally of an approximately semi-cylindrical portion which is held against axial movement by the concave walls of the rocker, as by being provided with one or more extensions in the form of a coaxial body or bodies of revolution whose surface or surfaces intersect the cylindrical surface, so that a boundary edge or edges are formed at the junction or junctions of the surfaces of the bodies of revolution. In cooperation with the similarly shaped depressed wall of the rocker which receives it, the bearing serves to guide and retain the rocker in its predetermined position and prevents shifting of the rocker in the horizontal or vertical plane. The rocker is concave in shape and its inner surface is correspondingly shaped or grooved to provide what may be called a track or raceway or raceways with which the boundary edge or edges of the bearing cooperate to retain the rocker against undesired or irregular movement. In consequence, the rocker in the structure of the present invention will always be in full engagement with the ends of the push rod and valve stem over the whole of their opposing surfaces at the regions of interengagement, resulting in reduced local unit pressures and reduced and uniform wear with resulting minimal vibration.

The rocker pivot or bearing of the present invention in its preferred form is composed of three sections, namely, a central section which is of approximately semi-cylindrical shape, and two end sections which may be defined as frusto-conical in shape, the general outline being that of an approximately half cylinder whose end portions taper inwardly, i.e., toward the central axis of the cylinder. Where these end sections meet the central section there are formed definite boundary edges which are received in a correspondingly shaped depression in the rocker and serve to prevent lateral or axial shifting of the rocker relative to the bearing in either direction of its length, and also rotation of the rocker about the axis of the supporting stud. This confinement of the rocker is aided further by the more or les flat ends of the pivot which may engage correspondingly flat walls at the sides of the depressed portion of the rocker. The upper face of the bearing presents a flat surface having straight edges at its ends parallel to each other, the side edges being each composed of a central straight line and end portions slightly inclined inwardly thereto, all in contrast to the circular cross-section of the bearings now commonly in use.

In another embodiment of the invention, the guide pivot or bearing is composed only of the conical sections, there being no central cylindrical portion. In this form of the invention, there will be provided only a single boundary edge, as will readily be understood.

The above and other objects of the invention will become clear from the following detailed description thereof, taken together with the accompanying drawings in which:

FIG. 1 is a vertical section, partly in elevation, through a rocker and its guide pivot or bearing constructed pursuant to the present invention;

FIG. 2 is a top plan view of the rocker and its pivot or bearing;

FIG. 3 is an enlarged top plan view of the bearing;

FIG. 4 shows a side view of the bearing; while

FIG. 5 presents an end view thereof.

Referring to the drawing, there are shown a portion of the cylinder head 10 and the push rod 11, valve stem 12, and return spring 13 associated with one of the valves of the engine. At 14 there is shown a bolt or stud which is secured in a suitable opening in the cylinder head, preferably by a screw-threaded connection. The bolt passes thru an elongated opening 15 in an irregularly dished rocker 16 whose concave surface faces upwardly, as illustrated in FIG. 1. This general type of rocker is known in the art as well as the manner of its cooperation with the pushrod 11 to transmit the motion of the latter to effect opening of the valve (not shown) attached to the valve stem 12.

The bolt 14 is milled at diagonally opposite regions to provide flat sides 17 terminating in shoulders 20, for a purpose which will appear hereinafter.

The bearing member of the present invention is shown at 18. In contrast to the spherical bearing surface of prior bearings of this type, the bearing 18 is non-spherical and is of circular outline only in the plane of the paper, as shown in FIG. 1, and in planes parallel thereto. However, in transverse planes, the cross-sections do not correspond to those of a sphere, but rather to those of intersecting bodies of revolution of different radii, as shown, for example, in FIG. 4.

As shown in FIG. 3, the bearing is provided with a more or less central opening 19 to receive the bolt 14 and is of a shape corresponding to a cross section of the bolt below its shoulders 20; in other words, the opening is composed of two circular arcs 21 corresponding substantially to the diameter of the upper portion 22 of the bolt (allowing for a slight clearance) and of straight sides 23 which accommodate the flattened sides 17 of the bolt. These matching outlines of the lower bolt portion and opening 19 prevent relative angular movement of the bearing about the axis of the bolt, and hence also of the rocker about the bolt.

The bearing 18, while possessing a circular outline in the plane of the drawing to allow oscillation of the rocker in such plane, is non-circular in the transverse direction at one or more regions in order to prevent angular and transverse linear movement of the rocker with reference to the axis of the bolt. This can be accomplished by making bearing 18 of various shapes other than of circular cross-section in planes transverse to the plane of the drawing, the concave surface of the rocker being correspondingly shaped to fit such non-circular region and thereby hold the rocker against movements other than truly oscillatory movements, limited more or less to the plane passing through the centers of the push rod 11 and valve stem 12. A convenient way of shaping the bearing is to make its end portions, indicated at 24 and 25, of frusto-conical shape, the cooperating portions of the rocker being correspondingly configured.

In a further development of the invention, means are provided for preventing the rotation of the rocker about the axis of the bolt and resulting gouging of the bolt by the rocker. To this end, the bolt is milled at one side, or preferably, at opposite sides to provide more or less flat surfaces, so that the cross-section of the bolt at such portion is only partially circular. The elongated opening in the rocker is so shaped that the side walls of such opening may be located adjacent to the milled sides of the bolt with a slight clearance of the order of about 0.006 to 0.008 inch. Thereby rotation of the rocker about the bolt is substantially completely prevented.

The opposite flat ends of the bearing member can also be made to cooperate with the inner faces of the side walls of the rocker to limit the relative rotational movement of the bearing and rocker to an insignificant degree. To this end, the walls of the rocker facing the ends of the bearing are made flat, and so spaced that a clearance of only about 0.006 to 0.008 inch is provided between each end of the bearing and the adjacent wall of the rocker.

It will be seen from the foregoing that I have provided a non-spherical pivot member or bearing for the rocker of internal combustion engines which in its simplest form comprises an approximately half, axially divided, body of revolution composed of at least two, but preferably three, intersecting bodies of revolution formed by rotating two intersecting lines, or preferably, a line with whose ends two other lines intersect at an angle thereto, about an axis spaced from the points of intersection.

While the bearing can be of V-shape, the rocker having a corresponding groove, in the presently preferred form of the invention described above, the central portion of the bearing is at least partially cylindrical, while the end portions are of semi-frusto-conical shape. While linear displacement in the direction of the axis of the bearing, or angular displacement about the axis of the bolt can be accomplished also by providing a (semi-) cylindrically shaped bearing with circular grooves or ridges which mate with correspondingly positioned ridges and grooves in the concave rocker, the embodiment of the invention shown in the drawing is simpler and more economical to manufacture on a large scale.

By reason of the confinement of the rocker to its intended plane of oscillation, full contact between the ends of the rocker and the ends of the pushrod and valve stem is always maintained, with resulting reduced wear. The rocker consequently remains in continuous contact with the push rod and valve stem, so that vibration and noise are greatly reduced.

This is in contrast to the known spherical type of bearing, with which there is actually no positive guidance provided for the push rod, rocker, and valve rod assemblies, the major guidance being afforded by the reception of the rounded end of the push rod in a correspondingly shaped socket at one end of the rocker. This, however, is not sufficient to hold the rocker against undesired movement, resulting in wear caused by the high frequency of reciprocation of the rocker, especially combined with the vibration of the engine arising from other causes. The vibration causes the ends of the rocker, push rod, and valve stem to strike each other across gaps whose length increases with the wear on the parts which accounts for a large part of the noise accompanying the operation of known constructions.

I prefer to employ with the rocker described above a self-locking bolt which is received in a tapped bore in the cylinder head, the bolt being provided with a self-locking thread, so as to withstand the vibrations of the engine. Proper adjustment of the position of the bearing can then be made merely by rotation of the bolt in one or the other direction; thereby the separate nut and lock washer heretofore employed may be eliminated. There can, however, be employed also a non-self-locking type of bolt which is screwed into a tapped bore in the cylinder head and is locked into position by a lock nut which bears against the top of the cylinder head.

I claim:

1. The combination with a bearing for the valve rocker of internal combustion engines, said bearing being perforated to receive a supporting element, the bearing being composed of a plurality of coaxial approximately half bodies of revolution formed by rotation about a common axis of a straight line parallel to the axis and two straight terminal lines angularly and symmetrically disposed with respect to the axis and forming acute angles therewith, said terminal lines forming obtuse angles with the first-mentioned line of a dished rocker having a concave surface facing upwardly, said rocker having an opening in registry with the opening in the bearing for receiving the said element, the concave surface of the rocker being shaped to interfit with the surfaces of revolution of the bearing and acting to inhibit relative movement between the bearing and rocker, both angularly and axially with respect to the axis of the bearing.

2. The combination according to claim 1, wherein the bearing is composed of a central semi-cylindrical portion and end portions which are semi-frusto-conical in shape.

3. The combination according to claim 1, wherein the supporting element is in the form of a stud provided with diagonally opposite flat faces extending parallel to its axis and each terminating in a shoulder, the upper surface of the bearing abutting against said shoulders.

4. The combination of a bearing with the valve rocker of an internal combustion engine, said bearing being perforated to receive a supporting element and having bearing surfaces composed of a plurality of dissimilar coaxial bodies of revolution formed by the revolution of angularly disposed lines about a single axis perpendicular to the axis of the perforation, said rocker being dished and having a concave portion facing upwardly, said rocker having an opening in registry with the perforation in the bearing for receiving said element, the concave portion of the rocker having bearing surfaces shaped to interfit with the bearing surfaces of the bearing and acting to inhibit relative movement between the bearing and rocker both angularly and axially with respect to the axis of the bearing, said supporting element being in the form of a stud provided with diametrically opposite flat faces, the opening in the rocker being elongated and having straight walls parallel to the plane of oscillation of the rocker and conforming to and fitting against the flat faces of the stud.

References Cited by the Examiner

UNITED STATES PATENTS

| 2,934,051 | 5/1960 | Drew | 123—90 |
| 3,112,740 | 12/1963 | Sampietro | 123—90 |
| 3,150,648 | 9/1964 | Gropp | 123—90 |
| 3,198,183 | 8/1965 | Ball | 123—90 |

MARK NEWMAN, *Primary Examiner.*

KARL J. ALBRECHT, *Examiner.*

A. L. SMITH, *Assistant Examiner.*